/ Patented Dec. 6, 1938

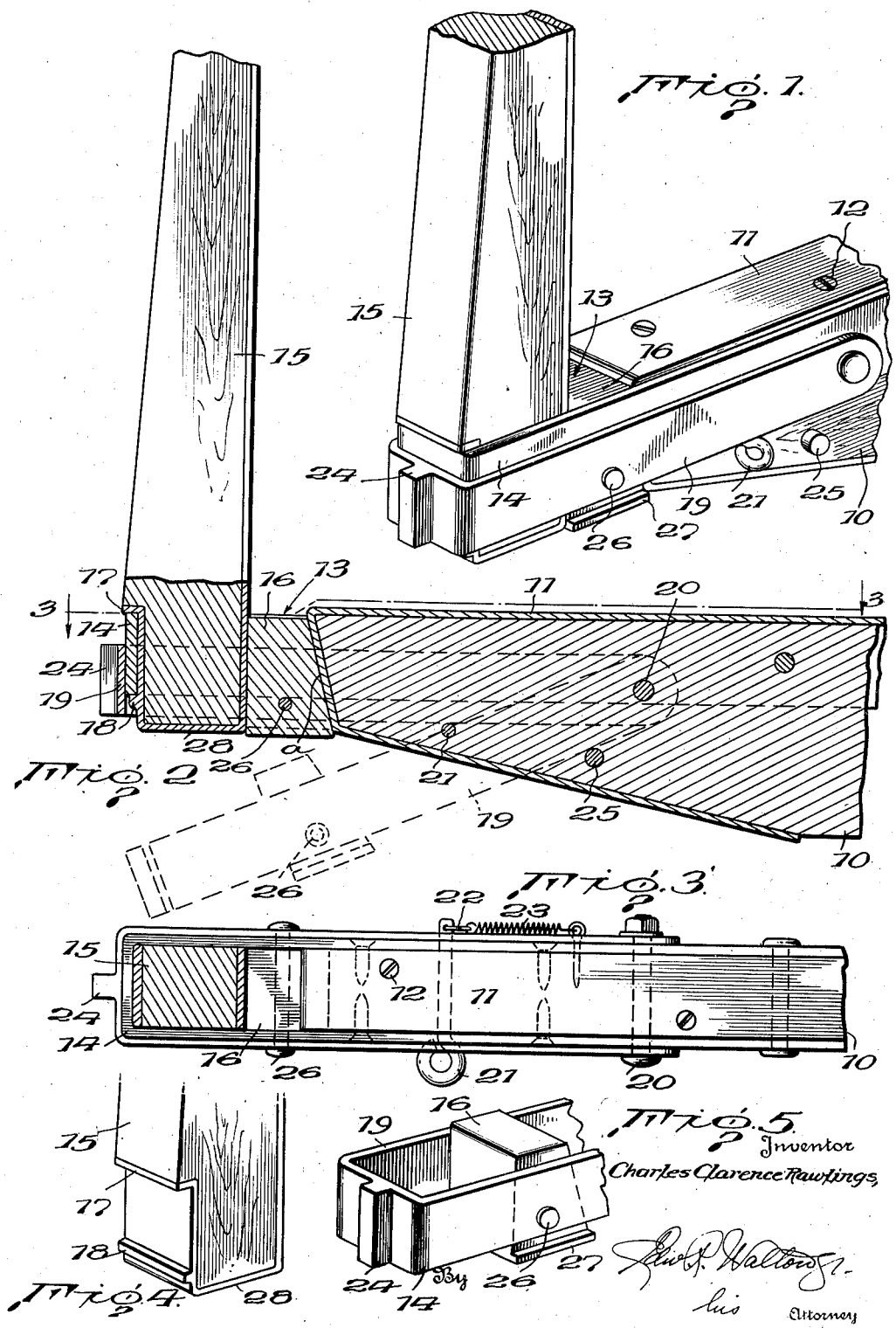

2,139,317

UNITED STATES PATENT OFFICE 2,139,317

LOCKING MEANS FOR GUARD STANDARDS OF VEHICLE BODIES

Charles Clarence Rawlings, Waverley, Va.

Application June 4, 1937, Serial No. 146,498

6 Claims. (Cl. 280—147)

The present invention relates to means for releasably locking in place the guard standards or side walls of trucks, freight cars and the like, particularly, but not necessarily, those used in transporting logs, pipes, lumber, bales etc.

Heretofore, the movable guard standards or side walls of trucks and the like have been held in place by having one end thereof fitted into a suitable socket or recess provided in the body platform or bolster of the vehicle. These standards are held in the sockets either by nicely fitting them thereinto or depending upon the weight and pressure against them of the load carried by the vehicle. In all instances, of which the applicant has knowledge, when the load bears against the standards or side walls of the vehicle, it is extremely difficult to remove the standards from their holding sockets for unloading purposes by reason of the pressure of the load against them which tends to bind the standard in the socket. In the case of heavy loads, such as logs, pipes and the like, where the load has a tendency to settle and flatten out against the standards, great effort is necessary to remove the standards from the sockets by means of sledge hammers, which, when driven against the butt end of the standard, tends to demolish or distort it rendering its removal more difficult and in some instances impossible. Due to vibration or jolting these standards sometimes work out of position and fall from the vehicle, resulting in great hazard by allowing the load or contents of the vehicle to fall therefrom either causing dangerous obstacles to lie in the road or fall upon passing vehicles or persons who sustain great injury.

The object of the present invention is to provide a means which will lock the standard in position against removal and which may be quickly and easily moved from locking position to permit quick and ready removal of the standard from its socket irrespective of the pressure of the load bearing against it, thus eliminating the possibility of deforming, mutilating or breaking the standard.

With the above and other objects in view the invention resides in the sundry details of structure, combination and arrangement of parts hereinafter more fully described and pointed out in the appended claims.

In the drawing which shows by way of example the embodiment of the invention as at present devised:

Figure 1 is a perspective view of a bolster and standard equipped with the present invention;

Figure 2 is a longitudinal sectional view taken through the bolster shown in Figure 1 with certain of the parts indicated in dotted lines to show the manner of disconnection;

Figure 3 is a plan view taken substantially on line 3—3 of Figure 2;

Figure 4 is a fragmentary perspective view of the lower end of the standard; and Figure 5 is a fragmentary detail perspective view of the locking means.

Referring in detail to the drawing, in which like reference characters refer to similar and like parts throughout the drawing, 10 denotes a portion of a flat car or other vehicle which may form the flooring or body of the vehicle but more specifically is here referred to and shown as a bolster commonly found in most vehicles upon which a flooring may be disposed. In trucks or vehicles used for transporting pipes, logs or the like usually no flooring is used, the articles resting directly upon bolsters. The bolster may be made of any suitable material and is here shown of wood faced with metal 11 secured to it in any suitable manner such as by screws 12.

The bolster is provided in any suitable manner with an opening or recess or socket generally indicated at 13 at an end portion thereof. This socket may be provided by providing a suitable recess in the bolster per se or by placing on the end of it a stirrup or U-shaped strap suitably fastened to the bolster or to the side edge of the vehicle platform or body. In the present instance and for the purpose of illustration, the socket 13 is provided by securing at the end of it a U-shaped strap 14, with its closed end lying opposite and spaced from the end of the bolster 11 and the sides or arms of the U embracing or lying on opposite sides of the bolster, said arms being secured in position by suitable screws, bolts or other fastening means, thus providing the socket 13. The socket 13 is of such size as to receive the end of the standard 15 and a binding or locking member 16, which is in the form of a spacing or filler block, and to allow the lower end of the standard to be swung out of the socket when the member 16 is removed. One face of the standard is usually provided with a shoulder 17 which rests upon the upper edge of the socket and the filler member 16 may consist of a wedge shaped block inserted in the socket to clamp the standard therein.

In the present embodiment the locking or wedge member 16 has a straight face which abuts against the back face of the standard and an inclined face *a* which engages a complemental rear surface within the socket, as shown at the end of the bolster 10. The standard is also provided with a locking lug or lip 18 which, when the standard is in position, engages the lower edge of the socket 13. Thus when the standard and locking member 16 are in position, the standard is tightly held in the socket against movement in all directions.

As a matter of convenience in the operation of the locking member 16 and to prevent its loss, it is carried by an arm 19 pivoted to the bolster at 20 and is so positioned on the arm that, by movement of the latter on its pivot, the locking member may be moved into and out of engagement. The arm may be held in locking engagement by any suitable means, such as a headed pin 21 passing through an opening in the bolster and underlying the arm so that the latter will rest upon it, when the arm is in its normal locking position. The free end of the pin may be held against accidental removal by a cotter pin or any other convenient latching member, such as a hook 22 carried on the end of the spring 23 secured to any convenient part of the structure. When the hook is in the opening provided in the pin 21 the spring 23 is under tension, thus tending to hold it in place.

It is proposed that the arm 19 may comprise a U-shaped strap member adapted to embrace or nest about the strap member 14, as shown clearly in Figures 1 and 2 of the drawing, the closed end of the strap 19 lying adjacent the closed end of the strap 14 in order to reinforce and strengthen the socket, and being provided with a suitable projection 24 for receiving the blows of a hammer whereby the arm 19 may be moved to its dotted line position for removing the locking member 16 from locking position as in Figure 2. A stop 25 is provided against which the arm may engage to limit its downward movement. This movement needs only to be sufficient to permit removal of the locking member 16 from the socket.

The locking member 16 is pivoted on the arm 19, as at 26, so as to allow slight movement thereof, this movement being limited by flange or other abutment 27 to prevent it from turning out of position, thus permitting easy insertion into place without adjustment.

From the above, it will be manifest that the standard 15 may be easily locked against movement in all directions and firmly held in position, while at the same time it may with great ease and celerity be released from its locking position without damaging the standard in any way and with a minimum of effort.

It will also be manifest that the standard receiving opening of the socket 13 is of such dimensions or width between the wall 14 and the surface or wall a that when the locking member 16 is removed from locking position the standard 15 may be fulcrumed at 17 and its lower end will pass clear of the surface a of the socket, thus requiring no hammering to remove the standard because there will be no binding of the standard in the socket, but may be easily and readily removed. Should the pressure of the load on the side of the standard be sufficient this pressure will automatically cause the above mentioned fulcrumed movement of the standard to remove the standard out of the socket as soon as the locking member has been moved to the dotted line position shown in Figure 2. Thus, the pressure which heretofore has made it difficult, and in some instances impossible, to remove the standard from the socket is now employed to remove the standard without damage to the latter.

It is also proposed to have the socket engaging portions of the wood standards as well as its back face lined or covered with sheet metal 28, as shown, in order to give it additional strength and to prevent undue wear. Of course it is obvious that, if the standard is made of metal throughout, this facing is not required or necessarily desirable.

Having thus described the invention in detail and the manner in which the same is to be performed, it is understood that the invention is not to be limited to the exact details of the description and disclosure in the drawing herewith, because the same may be modified and varied in numerous ways within the scope of the present invention, and it is desired that the invention is not to be limited beyond the scope of the appended claims.

That which is claimed is:

1. A device of the character described, comprising a removable load retaining guard standard, a supporting member for the standard and having a socket therein for receiving the standard, a locking wedge member pivotally mounted on a substantially U-shaped carrier mounted to move into and out of socket embracing position, said locking wedge member being positioned on the carrier so as to be moved into and out of the socket, according to the position of the carrier, for binding said standard in or releasing it for removal from said socket, and removable means for positively maintaining said carrier in socket embracing position.

2. A device of the character described, comprising a removable load retaining guard standard, a supporting member for the standard, a substantially U-shaped member having its ends secured to the supporting member and its closed end portion forming a socket for receiving the standard, a second U-shaped member disposed to surround and embrace said first U-member to reinforce the same and pivoted at its free ends, a locking filler member carried by said pivoted U-shaped member moved by the latter into and out of said socket, according to the position of the carrier for binding the standard into or releasing it for removal from said socket.

3. A locking means for guard standards of vehicle bodies which permit the standard to swing out of position under the pressure of the load retained thereby, comprising a movable load retaining guard standard having a socket engaging end portion, a substantially horizontal supporting member for the standard having a socket therein for receiving the end portion of said standard, said socket opening being of such dimensions that it is only partially filled by said socket engaging end portion of the standard when in position therein, a filler member removably inserted in said socket for holding the standard in the latter against movement, the opening of the socket having a width permitting the lower end of the socket engaging portion of the standard to swing out of the socket, when the filler member is removed from the socket, under the pressure of the load against the standard.

4. A locking means for guard standards of vehicle bodies which permit the standard to swing out of position under the pressure of the load retained thereby, comprising a removable load retaining guard standard having a socket engageable end portion, a load supporting member having a socket in an end portion thereof for receiving said end of the standard, and means insertable into the socket between the rear face of the socket and the standard for binding the standard in the socket against movement; the opening of the socket having a width permitting the lower end of the socket engaging portion of the standard to swing out of the socket, when the filler member is removed from the socket, under the pressure of the load against the standard.

5. A locking means for guard standards of vehicle bodies which permit the standard to swing out of position under the pressure of the load retained thereby, comprising a removable load retaining guard standard having a socket engageable end portion, a bolster member for the standard and having a socket in the end thereof for receiving the standard, complemental interlocking parts on the bolster and standard, means insertable into the socket from the underside of the bolster between the rear face of the socket opening and the standard for binding the standard in the socket against latteral movement and for holding said interlocking parts in engagement to prevent longitudinal movement of the standard, the width of the socket in the direction of the swinging movement of the standard being greater than the length of the socket engaging end of the standard so that when the binding means is removed from the socket the standard may swing therefrom under the pressure of the load thereagainst.

6. A device of the character described comprising a removable load retaining guard standard, a supporting member for the standard and having a socket therein for receiving the standard, a locking wedge member also receivable in the socket for binding the standard therein, a movable carrier for the wedge member and attached to the supporting member for movement relative to said socket to move said wedge member into and out of said socket, according to the position of the carrier, for binding the standard in or releasing it for removal from the socket.

CHARLES CLARENCE RAWLINGS.